United States Patent
Maass

(10) Patent No.: US 6,571,513 B2
(45) Date of Patent: Jun. 3, 2003

(54) SEALING A MOVABLE AND AN ABUTTING FIXED WINDOW PANE OF A MOTOR VEHICLE

(75) Inventor: Klaus-Peter Maass, Isenbuttel (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 09/834,217

(22) Filed: Apr. 12, 2001

(65) Prior Publication Data
US 2001/0034976 A1 Nov. 1, 2001

(30) Foreign Application Priority Data
Apr. 12, 2000 (DE) ..................................... 200 06 771 U

(51) Int. Cl.⁷ ................................................. E06B 7/16
(52) U.S. Cl. .......................... 49/489.1; 49/440; 49/414
(58) Field of Search .............................. 49/490.1, 489.1, 49/492.1, 498.1, 440, 416, 414, 428, 502; 296/146.2, 146.15, 146.16, 146.5; 52/204.51, 208, 716.5

(56) References Cited

U.S. PATENT DOCUMENTS

| | | | | |
|---|---|---|---|---|
| 4,370,832 A | * | 2/1983 | Koike ........................ 49/490.1 |
| 4,614,061 A | * | 9/1986 | Brocke ......................... 49/440 |
| 4,628,639 A | * | 12/1986 | Lownsdale ................. 49/498.1 |
| 4,653,230 A | * | 3/1987 | Seo et al. ..................... 49/502 |
| 4,800,681 A | * | 1/1989 | Skillen et al. ................ 49/440 |
| 4,953,331 A | * | 9/1990 | Ziegler et al. ................ 52/208 |
| 5,139,307 A | * | 8/1992 | Koops et al. ................ 296/201 |
| 5,199,761 A | * | 4/1993 | Dannecker et al. ..... 296/146.16 |
| 5,219,382 A | * | 6/1993 | Backes ......................... 49/440 |
| 5,557,890 A | * | 9/1996 | Levy et al. ................... 49/502 |
| 5,702,148 A | * | 12/1997 | Vaughan et al. ......... 296/146.9 |
| 6,250,017 B1 | * | 6/2001 | Gtessier ....................... 49/440 |

FOREIGN PATENT DOCUMENTS

DE  41 06 715  8/1996

* cited by examiner

Primary Examiner—Gregory J. Strimbu
(74) Attorney, Agent, or Firm—Carlson, Gaskey & Olds P.C.

(57) ABSTRACT

A sealing arrangement for movable window pane and a fixed window pane of a vehicle, in particular, for a lowerable side window pane and a fixed triangular window pane in a rear door of a passenger car, comprises a profile element, arranged between the movable window pane and the abutting fixed window pane, and a sealing profile, placed inside the profile element, for the guidance and sealing of the movable window pane. In order to reduce air turbulences caused by the profile element, the sealing profile and the profile element are constructed in such a way that the movable window pane rests on a sealing surface of the sealing profile and with the edge area of its interior surface and possibly its lateral face sealed to the sealing surface, and that the fixed window pane is attached on the exterior side of the profile element.

16 Claims, 1 Drawing Sheet

SEALING A MOVABLE AND AN ABUTTING FIXED WINDOW PANE OF A MOTOR VEHICLE

BACKGROUND OF THE INVENTION

The invention relates to an arrangement for sealing a movable and an abutting fixed window pane of a vehicle, in particular for a side window that can be lowered and a fixed triangular pane in a rear door of a passenger car.

Sealing arrangements of this type, provided between a movable window pane and a fixed window pane abutting against it, are generally known in rear doors of passenger cars when it is desired that the side window pane of the rear door (side window) be completely lowerable. As a rule, without a division of the side window, the latter can be lowered only partially into the body of the rear door, since the section in the rear door provided for the wheel case of the rear wheel prevents a complete lowering of the side window. The divided side window of a rear door consists of a so-called triangular window pane, which is fixed and, as viewed in the direction of driving of the passenger vehicle, is arranged in the rear portion of the door, and of a lowerable side window pane, which is arranged in the front portion of the rear door. Between the two side window panes, a vertically extending sealing arrangement is provided which, on the one hand, provides the sealing surface for the lowerable side window pane and, on the other hand, offers a surface for accommodating the frame of the fixed triangular window pane. The sealing arrangement consists essentially of an H-shaped profile element (dividing strut), made of aluminum or steel, in whose first U-shaped area a sealing profile for the lowerable side window pane is placed and into whose second U-shaped area the fixed side window pane is placed.

The use of an H-shaped profile element as a stabilizing basic element for the sealing arrangement results in the sealing arrangement protruding several millimeters from the window pane front formed by the exterior sides of the fixed and the movable side window pane. The H-shaped profile elements are also possibly clad with an elastomer, causing the sealing arrangement to protrude outwardly even more. This construction may lead not only to undesirable optical appearances, but also increases the Cw value and leads to an increase in the formation of wind noises.

The DE 41 06 715 A 1 document shows an h-type divider bar with the movable window panel being guided in the U-shaped part of said divider bar. While this approach reduces air turbulences, the movable window panel has a stepped lateral face which is complicate in production and a two-piece construction of the divider bar which two pieces need adjustment with respect to each other.

SUMMARY OF THE INVENTION

Based on this state of the art, the present invention is based on the problem of creating a sealing arrangement for a movable and an abutting fixed window pane of a motor vehicle, in particular for a lowerable side window pane and a fixed triangular window pane in a rear door of a passenger car which, with respect to the exterior window pane front formed by the movable and the fixed window pane, is constructed particularly flat.

With a sealing arrangement for a movable and an abutting fixed window pane of a motor vehicle, particularly for a lowerable side window pane and a fixed triangular window pane in a rear door of a passenger car, this problem is solved.

By means of the present invention, it is possible that part of a sealing arrangement which projects outwardly from the window pane front, formed from a movable and an abutting fixed window pane of a motor vehicle, protrudes only so far that, on the one hand, optical requirements with respect to the external appearance of the sealing arrangements can be met and, on the other hand, a reduction of the Cw valve and the reduction of wind noises connected therewith is possible. With the present sealing arrangement for a movable and an abutting fixed window pane of a motor vehicle, these requirements are met in that the movable window pane rests only on the outside of a sealing surface of a sealing profile, placed inside a profile element and, in this way, seals along the sealing surface only with the edge area of its interior face and with its lateral face. A usually customary complete U-shaped gripping around the edge area of the movable part of the window pane no longer takes place. Also, the fixed window pane is no longer arranged between two extensions of the profile element providing the stability of the sealing arrangement, but is fastened on the profile element only from the outside. In this way, a frame extension of the profile element no longer protrude from the window pane front formed by the movable and the fixed window pane.

Preferably, the profile element has a T-shaped cross-section with a flange and a cross-piece, since hereby the necessary stability can be provided in the direction of its profile and a support of the fixed and of the movable window pane, diagonally as well as in the direction of a motor vehicle, is ensured. For this purpose, the cross-piece of the profile element extends at least into the gap between the movable window pane and the fixed window pane and the flange area of the profile element extends largely parallelly with respect to the two window panes and at a distance with respect to their interior surfaces on the interior of the vehicle. In order to ensure an optimal support of the two window panes at their interior and front surfaces, in a preferred embodiment, the cross-piece is guided through a gap between the two window panes and slightly protrudes from the exterior window pane front.

In order to attach the sealing profile for the movable window pane on the profile element, swallow tail-like locking elements are formed on that side of the sealing profile which is facing the sealing surface for the movable window pane and engage counter-locking elements provided on the profile element in the form of undercuts. Hereby, a releasable as well as stable attachment of the sealing profile on the profile element can be achieved. Preferably, the counter-locking elements in the form of undercuts are arranged on the cross-piece and on the flange of the profile element, respectively.

For the placement of the movable window pane on the sealing surface of the sealing profile exclusively from the outside, a construction of the sealing profile in the form of a tubular profile with a chamber and having a cross-section in the shape of a quarter circle is advantageously suitable. In this way, the crosspieces of the sealing profile which is in the shape of a quarter circle and wherein the cross-pieces are at a right angle to each other, can accommodate the locking elements, and the outer section of the sealing profile, which forms the sealing surface with the movable window pane and is in the shape of a quarter circle, can optimally rest against the inside and the front face of the edge area of the movable window.

In a preferred embodiment, the profile element is, outside the connection area of the sealing profile, provided with a cladding made of an elastomer, preferably a surrounding made of a polyurethane foam.

The design of the above-described sealing arrangement makes a particularly flat construction toward the outside possible, so that the sealing arrangement between the movable and the fixed window pane protrudes from the exterior window pane front of the movable and the fixed window pane merely by a height which is less than the thickness of the window panes, preferably less than two millimeters—or not at all.

For the attachment of the fixed window pane on the profile element, on the one hand, the simultaneous cladding with an elastomer—preferably a surrounding with polyurethane foam—of the profile element and of the edge area of the fixed window pane, i.e. its interior and exterior sides as well as its lateral face, has proven to be advantageous.

The fixed window pane may also be attached by gluing. For this purpose, preferably in connection with the cladding from the profile element with an elastomer, preferably with polyurethane, a recess is formed which corresponds to the contour of the edge area of the fixed window pane. Into this recess, th fixed window pane is glued with its interior side in the edge area as well as with its lateral face.

By means of both types of attachment or sealing of the fixed window pane, the requirements with respect to the flat construction of the sealing arrangement are met.

The profile element used in the sealing arrangement is preferably produced from extruded aluminum or from a shaped steel plate.

The above-mentioned structural components, as well as the claimed structural components described in the examples and which are to be used in accordance with the invention, are not subjected to any special exceptional conditions with respect to their size, form, material selection and technical conception, so that the selection criteria known in the respective area of application can find unlimited application within the framework of the claims.

BRIEF DESCRIPTION OF THE DRAWINGS

Additional details, characteristics and advantages of the object of the invention result from the subsequent description of the accompanying drawing in which, for example, a preferred example of the sealing arrangement of the invention is shown, wherein in the drawing

DETAILED DESCRIPTION OF THE PREFERRED EMBODIMENT

Figure 1:
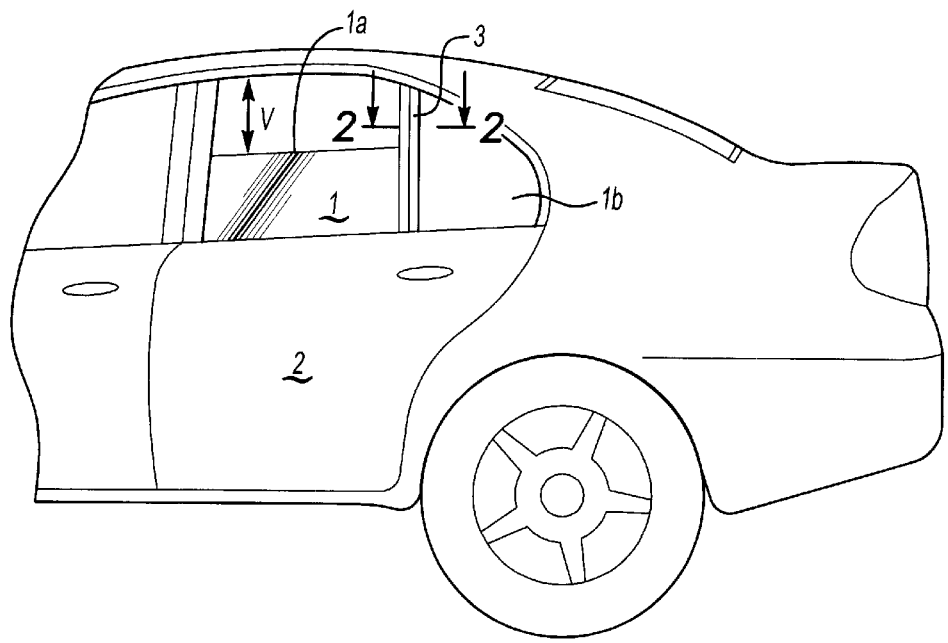
FIG. 1: shows a schematic view of a section of a window pane in a rear door 2 of a passenger car

FIG. 1 shows a section of a schematic view of a window pane 1 of a rear door 2 of a passenger car. It can be seen that the window pane 1 is divided into a window pane 1a, which can be lowered in vertical direction V, and a fixed window pane 1b (triangular window). Between the two window panes 1a and 1b a sealing arrangement 3 is present which extends essentially in the vertical direction.

The construction of the se ling arrangement 3 will be explained later in greater detail in connection with FIG. 2, which shows a cross-section through this sealing arrangement 3. The sealing arrangement 3 consists essentially of a T-shaped profile element 4, a cladding 5 (partial cladding) surrounding the profile element and made of an elastomer, preferably of polyurethane, and of a sealing profile 6 of rubber, placed into the profile element 4 for the vertically movable window pane 1a.

The profile element 4 is T-shaped, with a flange 4a and a cross-piece 4b. The flange 4a is aligned essentially parallel to the interior surfaces 1c of the two window panes 1 and extends at a distance from these and thus in the interior of the vehicle. The cross-piece 4b of the profile element 4 extends, starting at the flange 4a, between the lateral faces 1d of the two window panes 1 which face each other at a distance and protrudes from the window pane front formed by the exterior surfaces 1e of the two window panes 1 approximately by the material thickness of the cross-piece 4b. At the end which faces away from the flange 4a, the cross-piece 4b is hook-like in the direction of the sealing profile 6 so that, as viewed from the direction of the movable window pane 1a, a first locking element 8a for accommodating the sealing profile 6 is formed. Accordingly, the free end of the flange 4a facing the sealing profile 6 is constructed in a way, wherein an additional locking element 8b is formed there. These locking elements 8a and 8b, respectively, interact with one of two additional locking elements 8c and 8d, which are formed by an attachment 4c, expanding the cross-sectional area, located on that side of the flange 4a which is facing the sealing profile 6. The locking elements 8a and 8c and 8b and 8d thus form recesses with respectively accompanying lateral undercuts extending in longitudinal direction. The locking elements 8a to 8d have the task of accommodating the sealing profile 6 by means of clamping. For this purpose, corresponding swallow tail-like attachments 6a are molded on the sealing profile 6 which extend in longitudinal direction and form counter-locking elements 7a to 7d.

As viewed in cross-section the sealing profile 6 has the shape of a quarter circle, wherein the quarter circle-shaped section serves as a sealing surface 6b against which the movable window pane 1a rests and wherein the cross-pieces 6c of the sealing profile 6, which extend at a right angle to each other, form th surfaces accommodating the counter-locking elements 7a to 7d. Furthermore, it can be gathered from FIG. 2, that the sealing profile 6 is in the form of a tubular profile with a chamber 6d, hereby the required elasticity of the sealing profile 6 is made available to be placed against the movable window pane 1a. In FIG. 2, the sealing profile 6 is shown in the non-tensioned state, i.e. as with the lowered movable window pane 1a. For better understanding, however, the movable window pane 1a is drawn in the raised state and the sealing profile for this state is drawn with broken lines. Thus, it can be seen that the sealing surface 6b, when the window pane 1a is raised, rests only against the edge area of the interior surface 1c of the movable window pane 1a as well as its lateral face 1d. An additional resting of the sealing profile 6 against the exterior side 1e of the movable window pane 1a does not occur.

The profile element 4 is surrounded in the area outside the connection surfaces with the sealing profile 6 by a cladding 5 made of an elastomer, preferably of polyurethane. In the area of the exterior and interior side of the sealing arrangement 3, this cladding 5 has a thickness, which easily exceeds the thickness of the flange 4a of the profile element 4. In the area of the sides of the cross-piece 4b and of the flange 4a, which are facing the fixed window pane 1b, the cladding 5 serves for forming a surface against which the fixed window pane 1b rests. Here, the thickness of the cladding 5 is selected in such a way, that the two window panes 1a and 1b are bare aligned with each other and that a recess 9 is formed which is adapted to the contour of the edge area of the fixed window pane 1b. The fixed window pane 1b is glued into the recess 9. The gluing is indicated in FIG. 2 by means of crosses. The gluing thus takes place only in the edge area of the interior surface 1c and on the later face 1d of the fixed window pane 1b. The exterior surface 1e remains free.

Figure 2:
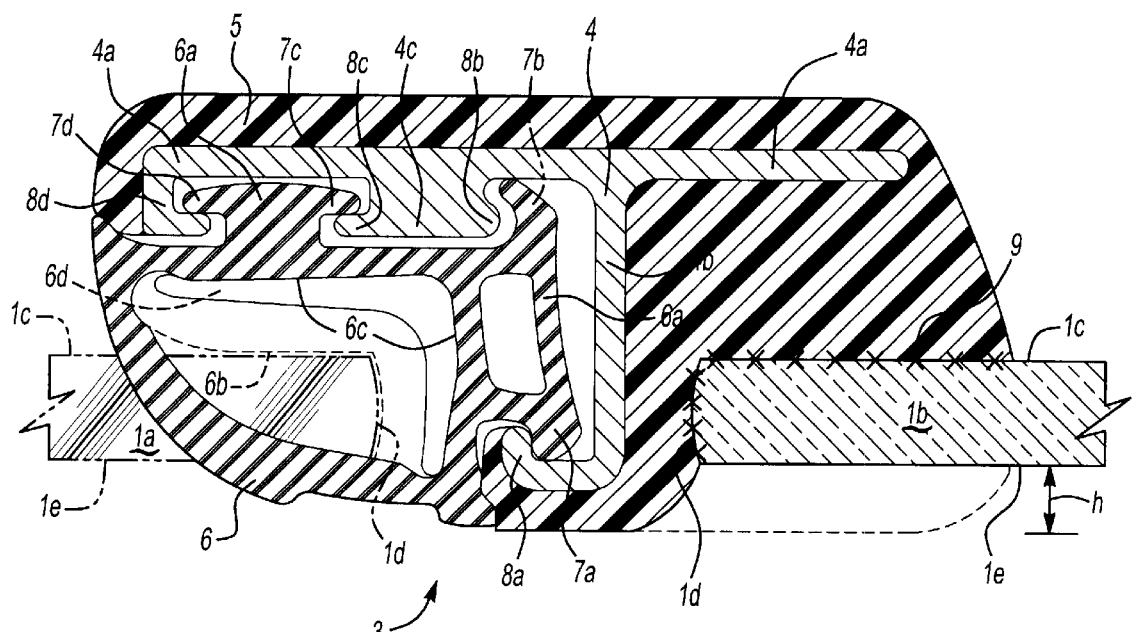
FIG. 2: shows a cross-section through a sealing arrangement 3 between a movable window pane and a fixed window pane along the line 11—11 in accordance with FIG. 1.

In FIG. 2, also a second type of attachment of the fixed window pane 1b is shown. Instead of the above-described gluing, a framing of the fixed window pane 1b takes place inside the cladding 5. Here, additionally, in the edge area of the fixed window pane, the exterior surface 1e is clad (see outer contour of the cladding 5, indicated by broken lines). Preferably, the profile element 4 and the fixed window pane 1 bare clad by covering them with polyurethane foam.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A sealing arrangement comprising: a moveable window pane a fixed window pane, a generally T-shaped profile element including at least two locking elements disposed generally orthogonally with respect to each other, the profile element arranged between said moveable window pane and said fixed window pane and a sealing profile for guiding and sealing of said moveable window pane including at least two generally T-shaped counter-locking elements each engaging in a respective one of said at least two locking elements of said profile element, wherein an edge area of said moveable window pane rests on a sealing surface of said sealing profile, and said fixed window pane is attached on an exterior side of said profile element.

2. The sealing arrangement as recited in claim 1, wherein said profile element comprises a flange and a cross-piece, in that said flange runs largely parallel to said moveable window pane and aid fixed window pane and extends at a distance from interior surface of said moveable window pane and said fixed window pane and said cross-piece extends between said moveable window pane and said fixed window pane.

3. The sealing arrangement as recited in claim 2 wherein said cross-piece projects between said moveable window pane and said fixed window pane.

4. The sealing arrangement as recited in wherein in claim 2 one of said at least two locking a elements is arranged at said cross-piece and the other of said at least two locking elements is arranged at said flange.

5. The sealing arrangement as recited in claim 1 wherein one of said counter-locking elements is formed on a side of said sealing profile which is opposite to said sealing surface of said sealing profile.

6. The sealing arrangement as recited in claim 1 wherein said sealing profile is a tubular profile with at least one chamber having a cross-section which is essentially in the shape of a quarter circle.

7. The sealing arrangement as recited in claim 6 wherein said sealing profile includes two cross-piece which are substantially at a right angle to each other and said sealing surfaces comprises a quarter-circle shaped surface, and each of said at least two counter-locking elements is arranged on a respective one of said two cross-pieces of said sealing profile.

8. The sealing arrangement as recited in claim 1 wherein said profile element, at least outside a connection area with said sealing profile, is surrounded by a cladding of an elastomer.

9. The sealing claim 8 wherein said cladding is made of a polyurethane foam.

10. The sealing arrangement as recited in claim 1 wherein said sealing profile projects from an exterior window pane front, formed by said moveable window pane and said fixed window pane, between said moveable window pane and said fixed window pane by a height which is less than a thickness of one of said moveable window pane and said fixed window pane.

11. The sealing arrangement as recited in claim 10 wherein said thickness is less than 2 mm.

12. The sealing arrangement as recited in claim 1 wherein an edge area of said fixed window pane includes elastomer cladding for attachment to said profile element, and said cladding at least partially covers said profile element.

13. The sealing arrangement as recited in claim 1 wherein said profile element, in an area of attachment to said window pane, an elastomer cladding and said cladding on an exterior side there of which faces away from said profile element has a recess that engages an edge area of said fixed window pane, and said fixed window pane is glued to said cladding.

14. The sealing arrangement as recited in claim 1 wherein said profile element is made of extruded aluminum.

15. The sealing arrangement as recited in claim 1 wherein said profile element is made of molded steel.

16. The sealing arrangement as recited in claim 1 wherein a lateral face of said moveable window pane is sealed to said sealing surface.

* * * * *

UNITED STATES PATENT AND TRADEMARK OFFICE
CERTIFICATE OF CORRECTION

PATENT NO.   : 6,571,513 B2
DATED        : June 3, 2003
INVENTOR(S)  : Klaus-Peter Maass It is certified that error appears in the above-identified patent and that said Letters Patent is hereby corrected as shown below:

Column 5,
Replace Claim 1 with the following, -- A sealing arrangement comprising: a moveable window pane, a fixed window pane, a generally T-shaped profile element arranged between said moveable window pane and said fixed window pane having at least two locking elements disposed generally orthogonally with respect to each other, and a sealing profile for guiding and sealing of said moveable window pane having at least two generally T-shaped counter-locking elements each engaging in a respective one of said at least two locking elements of said profile element, wherein an edge area of said moveable window pane rests on a sealing surface of said sealing profile, and said fixed window pane is attached on an exterior side of said profile element. --
Lines 38-39, delete "in that".
Line 40, "aid" should be -- said --.
Line 41, "surface" should be -- surfaces --.
Line 48, "after "recited in" insert -- claim 2 --.
Lines 48-49, delete "in claim 2".

Signed and Sealed this

Twenty-third Day of September, 2003

JAMES E. ROGAN
*Director of the United States Patent and Trademark Office*